US010194676B2

(12) United States Patent
Wehrle et al.

(10) Patent No.: US 10,194,676 B2
(45) Date of Patent: Feb. 5, 2019

(54) CRUMB PROCESS

(75) Inventors: Karina Wehrle, Slough (GB);
Christopher Abbott, Slough (GB)

(73) Assignee: MARS, INCORPORATED, McLean, VA (US)

( * ) Notice: Subject to any disclaimer, the term of this patent is extended or adjusted under 35 U.S.C. 154(b) by 830 days.

(21) Appl. No.: 12/297,674

(22) PCT Filed: Apr. 23, 2007

(86) PCT No.: PCT/GB2007/001471
§ 371 (c)(1),
(2), (4) Date: Mar. 30, 2009

(87) PCT Pub. No.: WO2007/125291
PCT Pub. Date: Nov. 8, 2007

(65) Prior Publication Data
US 2009/0297679 A1 Dec. 3, 2009

(30) Foreign Application Priority Data

Apr. 21, 2006 (GB) .................................. 0607926.3

(51) Int. Cl.
*A23G 1/56* (2006.01)
(52) U.S. Cl.
CPC ............ *A23G 1/56* (2013.01); *A23G 2200/12* (2013.01)
(58) Field of Classification Search
USPC ....................................................... 426/456
See application file for complete search history.

(56) References Cited

U.S. PATENT DOCUMENTS

| 2,211,740 | A | * | 8/1940 | Dietrich | 159/5 |
| 3,622,342 | A |   | 11/1971 | Russoff | 99/23 |
| 3,702,252 | A |   | 11/1972 | Veltman et al. | |
| 3,900,578 | A |   | 8/1975 | Turos | |
| 4,084,011 | A | * | 4/1978 | Chevalley et al. | 426/580 |
| 4,086,371 | A |   | 4/1978 | Minifie et al. | |
| 4,191,786 | A | * | 3/1980 | Nappen et al. | 426/593 |
| 4,267,703 | A |   | 5/1981 | Minifie et al. | 62/544 |
| 4,346,121 | A |   | 8/1982 | Turos | |
| 4,421,777 | A |   | 12/1983 | Chung | |

(Continued)

FOREIGN PATENT DOCUMENTS

| CA | 943808 | 3/1974 |
| DE | 2131447 | 12/1972 |

(Continued)

OTHER PUBLICATIONS

Crumb NPL, https://www.englishclub.com/esl-forums/viewtopic.php?t=32374, 2005.*

(Continued)

*Primary Examiner* — Michele L Jacobson
*Assistant Examiner* — Preston Smith

(57) ABSTRACT

A process for the production of crumb is disclosed in which a wet crumb feedstock comprising bulk sweetener, protein and water is formed and then simultaneously dried and comminuted in a thin layer rotary paddle dryer (20). The wet crumb feedstock is preferably formed into discrete, free-flowing granules prior to the simultaneous drying and comminuting. Apparatus for the production of crumb is also disclosed.

26 Claims, 1 Drawing Sheet

(56) References Cited

U.S. PATENT DOCUMENTS

| | | | |
|---|---|---|---|
| 4,609,557 A * | 9/1986 | Mao et al. | 426/549 |
| 4,664,921 A | 5/1987 | Seiden | |
| 4,668,522 A | 5/1987 | Cappel et al. | |
| 4,732,767 A | 3/1988 | Seiden et al. | |
| 4,770,236 A * | 9/1988 | Kulikowski | F26B 17/20 165/86 |
| 4,774,095 A | 9/1988 | Kleinschmidt et al. | |
| 4,781,938 A | 11/1988 | Pflaumer et al. | |
| 4,828,853 A | 5/1989 | Banks et al. | |
| 4,892,745 A | 1/1990 | Gage et al. | |
| 4,938,127 A | 7/1990 | Van Lengerich et al. | |
| 4,949,628 A | 8/1990 | Van Lengerich et al. | |
| 4,957,042 A | 9/1990 | Van Lengerich | |
| 4,960,043 A | 10/1990 | Van Lengerich et al. | |
| 4,961,941 A | 10/1990 | Cocco et al. | |
| 4,965,076 A | 10/1990 | Martin et al. | |
| 4,965,077 A | 10/1990 | Martin et al. | |
| 4,980,189 A | 12/1990 | Keme et al. | |
| 5,023,099 A | 6/1991 | Boehm et al. | |
| 5,030,468 A | 7/1991 | Van Lengerich et al. | |
| 5,145,699 A | 9/1992 | Dijkshoorn et al. | |
| 5,393,538 A | 2/1995 | Chmiel et al. | |
| 5,419,635 A | 5/1995 | Schulte et al. | |
| 5,523,106 A | 6/1996 | Gimmler et al. | |
| 5,591,474 A | 1/1997 | Miller | |
| 5,626,900 A | 5/1997 | Miller | |
| 5,962,063 A | 10/1999 | Siukola et al. | |
| 6,001,400 A | 12/1999 | Burger | |
| 6,139,885 A | 10/2000 | Jouanneau et al. | |
| 6,261,627 B1 | 7/2001 | Armstrong et al. | |
| 6,268,012 B1 * | 7/2001 | Sikora | A23B 7/0205 426/465 |
| 6,309,689 B1 | 10/2001 | Weaber et al. | |
| 6,397,490 B1 | 6/2002 | Inoki et al. | |
| 2001/0012536 A1 * | 8/2001 | Armstrong | A23G 1/047 426/631 |
| 2003/0129276 A1 | 7/2003 | Hansen et al. | |
| 2004/0191389 A1 | 9/2004 | Kochhar et al. | |
| 2004/0191403 A1 | 9/2004 | Hansen et al. | |

FOREIGN PATENT DOCUMENTS

| | | |
|---|---|---|
| EP | 0016745 | 10/1980 |
| EP | 0 248 462 A1 | 12/1987 |
| EP | 0574764 | 12/1993 |
| EP | 0711505 | 5/1996 |
| EP | 1 245 158 A1 | 10/2002 |
| EP | 1245158 A1 * | 10/2002 |
| EP | 1 308 094 A2 | 5/2003 |
| GB | 783861 | 10/1957 |
| GB | 1306356 | 2/1973 |
| GB | 1430017 | 3/1976 |
| GB | 1434748 | 5/1976 |
| WO | 02063974 | 8/2002 |

OTHER PUBLICATIONS

Minifie, "Chocolate, Cocoa, and Confectionary:", Science and Technology, 3rd Edition, Aspen Publishers, Inc. (1999), 144-149.

* cited by examiner

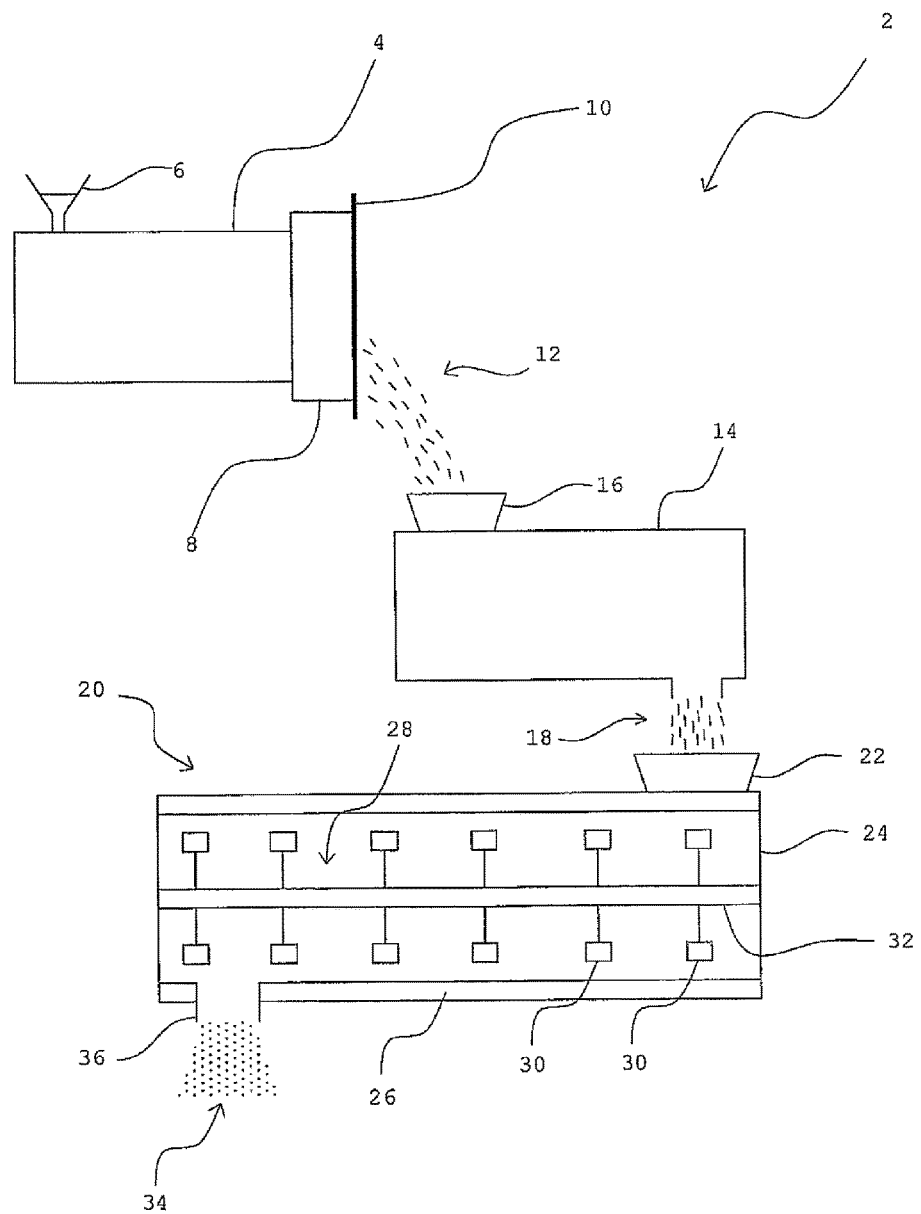

CRUMB PROCESS

The present invention relates to a process and apparatus for the production of crumb, in particular, chocolate crumb.

The mixture of sugar, milk (or dried milk and water), cocoa mass, and optional additives such as whey powder or lactose, known as chocolate crumb is commonly used in the confectionery industry as an intermediate in the production of chocolate. Chocolate made from crumb is known as 'crumb chocolate' and has recognised flavour characteristics which are distinct from non-crumb chocolates. The flavours are developed during the production of the chocolate crumb through heating the mixture of crumb ingredients. A fat, such as cocoa butter, is mixed with the chocolate crumb in order to produce the final crumb chocolate product.

In one commonly used process of producing chocolate crumb, sugar, milk powder, cocoa mass, water and other optional additives are mixed at around 50° C. to 70° C. to form a crumb paste containing between 5% and 10% water. The resultant crumb paste is viscous and sticky, making it difficult to handle. Once mixed, the crumb paste is formed into a thick slab on a moving belt and passed through an oven, in which it is heated slowly under vacuum for between 30 and 120 minutes at a temperature of between 50° C. and 130° C., until the water content of the paste is reduced to around 2% or less. The dried slab of crumb paste is then broken down into small pieces, which may be stored, or immediately further processed into crumb chocolate.

In an alternative process of producing crumb, liquid milk is used as a starting material. The liquid milk is first condensed to around 30-40% solids by heating under vacuum and then sugar is added to the milk and dissolved. The resultant mixture is condensed further to around 80-90% solids and then mixed with cocoa mass. This mixture can then be dried on a band dryer under vacuum as described above or flash dried, for example on a hot drum.

In other known processes, a high water content slurry is formed. In such processes, the slurry can be dried by depositing the slurry as a thin film on a rotating heated roller and boiling off the moisture; however, the high temperature required to achieve the rapid boiling results in the development of strong flavours in the resultant crumb. Alternatively, the high moisture slurry can be sprayed through a small nozzle into a stream of hot air, which dries the droplets quickly as they fall through a high tower; however, the spray drying equipment required is very expensive.

In these known processes for the production of crumb, the water content of the wet crumb paste or slurry must be reduced to less than 2% in the final crumb so that chocolate made from the crumb is of the correct viscosity. Attempts have been made to develop processes for the production of chocolate crumb without the presence of significant amounts of water, thus avoiding the need to dry the crumb. Such processes do not produce crumb with the flavour profile required and are therefore unsuitable for use in the manufacture of crumb.

In the conventional process for the production of crumb described above, most flavour development takes place during drying of the crumb since it is at this stage that the temperature and water activity of the paste are most suitable for Maillaird reactions to take place. The drying technique employed in conventional processes depends on the physical state of the material to be dried and the flavour profile which is desired for the crumb, for example, higher temperatures and longer drying times tend to produce crumb having relatively strong caramel flavours. A number of drying techniques are currently employed. A slurry or paste having a moisture content between 5% and 15% can be dried under vacuum at a pressure of between 50 mbar and 200 mbar on a band dryer (as described above) or in a box oven; however, long drying times are required and the cost and size of the drying equipment is high.

U.S. Pat. No. 4,086,371 describes a process in which a slurry containing sugar, milk solids and up to 30% water by weight is first condensed at a high temperature to a water content of between 4% to 6% by weight and then crystallised by a process of cooling to below room temperature and kneading. The product may be used directly to manufacture chocolate, without the need for a drying step.

It has been desired to provide an improved process for the production of crumb while ensuring that the crumb chocolate made from chocolate crumb produced by such a process has a flavour matching the crumb chocolate made from chocolate crumb produced by conventional processes.

According to a first aspect of the invention there is provided a process for the production of crumb comprising:
  (a) forming a wet crumb feedstock comprising bulk sweetener, protein and water; and
  (b) simultaneously drying and comminuting the wet crumb feedstock in a thin layer rotary paddle dryer.

The wet crumb feedstock is the crumb mixture prior to the final drying step and may be formed by a conventional process. The wet crumb feedstock may be derived from a high moisture slurry which has been partially dried by another method, or it may be made directly by mixing the crumb ingredients together to make a crumb paste. The form of the feedstock, and its water content, will depend on the process by which it has been produced. Preferably the wet crumb feedstock has a water content between 5% and 10%, more preferably between 5% and 8% and even more preferably 6% by weight.

Thin layer rotary paddle dryers, also known as fluidised layer dryers, are a known class of dryer. Dryers of this type typically comprise a cylindrical body surrounded by a heating sleeve which heats the interior walls of the body and a bladed rotor having a plurality of blades mounted on a shaft which is supported for rotation inside the cylindrical body of the dryer. A relatively small volume of wet crumb feedstock relative to the volume of the dryer is introduced into the dryer (preferably 50% or less, more preferably 30% or less, still more preferably 20% or less and most preferably 10% or less of the volume of the dryer) and the action of the rotors forces the feedstock into a layer on the heated walls and through the dryer. The action of the rotors also breaks up the crumb feedstock as it dries, so that the dry crumb leaving the dryer has the consistency of a powder. Machines of this type are commercially available, for example Hosokawa/Bepex "Solidaire" dryers.

The first aspect of the present invention provides a process for the production of crumb which utilises a drying technique which is significantly faster and more energy efficient than the conventional drying techniques described above. Furthermore, it utilises drying equipment which is significantly less expensive than equipment required in conventional drying techniques. The residence time of the crumb within the thin layer rotary paddle dryer is significantly less than the residence time in conventional processes and the dryer can be significantly smaller than conventional crumb dryers. Drying takes place at atmospheric pressure so the need for expensive and bulky vacuum equipment is removed. Furthermore, the dryer allows drying and comminution of the crumb to be carried out simultaneously, thereby combining two steps of the crumb production process and improving the efficiency of the process still further.

The significantly different drying conditions compared with conventional crumb drying techniques, such as the reduced residence time of the crumb within the dryer compared to conventional drying processes, would be expected to have detrimental effects on the development of flavour in the crumb and the flavour profile of chocolate made from the crumb; surprisingly, this has been found not to be the case.

For chocolate products on the market, an optimum flavour profile is established based on extensive consumer testing. Different chocolate products have slightly different flavour profiles which distinguish them from each other and which the consumer can associate with that product or brand. In particular, different crumb chocolate products have slightly different flavour profiles; however, the flavour profiles are similar enough that any crumb chocolate product is recognisable as a chocolate made from crumb and therefore distinguishable from non-crumb chocolate products. It is important for product consistency, to meet consumer expectations, that the flavour profile of a product is maintained. In conventional crumb drying techniques the temperature and residence times are carefully selected in order to achieve the desired flavour profile and differences in temperature and residence time can result in changes in that profile which would be unacceptable to the consumer. In particular, shorter residence times in conventional dryers do not allow certain desired flavours to develop fully, while longer residence times may results in over development of flavours. Higher temperatures may result in undesirable flavours. Unexpectedly, it has been found that the flavour profile of chocolate made from crumb produced by processes according to the invention, which has been dried in a thin layer rotary paddle dryer, has a flavour profile which substantially matches that of chocolates made from crumb produced by conventional processes. Furthermore, the drying conditions in processes according to the invention can be altered such that the flavour profile of the crumb chocolate produced by processes according to the invention can be altered depending on the flavour profile desired. As a result, chocolate made from crumb produced by processes according to the invention is indistinguishable to the consumer from crumb chocolate which is currently available, but advantageously, the crumb is produced using processes and apparatus which are significantly more efficient and cost effective than conventional processes and apparatus, as set out above.

Preferably, the wet crumb feedstock is formed into discrete, free flowing granules prior to step (b). Drying in a thin layer rotary paddle dryer is particularly effective if the feedstock entering the dryer is in a free flowing form, since the granules are more easily moved around within the dryer by the rotor and the smaller pieces of crumb provide a larger surface area so that moisture is lost more quickly from the crumb.

According to a second aspect of the present invention there is provided a process for the production of crumb comprising:
 (a) making a crumb paste comprising bulk sweetener, protein and water;
 (b) forming the crumb paste into discrete pieces of crumb;
 (c) conditioning the pieces to form crumb granules; and
 (d) simultaneously drying and comminuting the granules.

Prior to conditioning, the pieces of crumb are sticky, liable to coalesce and do not flow. The granules formed by the conditioning step have a non-sticky surface and exhibit useful flow properties. They do not adhere to each other and can be readily processed, in particular, they can be efficiently dried and comminuted.

Preferably, the conditioning step comprises maintaining the crumb at a temperature between 10° C. and 80° C., more preferably between 40° C. and 60° C., most preferably between 50° C. and 60° C.

According to a third aspect of the invention there is provided a process for the production of crumb comprising:
 (a) making a crumb paste comprising bulk sweetener, protein and water;
 (b) forming the crumb paste into discrete pieces of crumb; and
 (c) conditioning the pieces at a temperature between 10° C. and 80° C., preferably between 40° C. and 60° C., to from crumb granules.

Preferably the process according to the second aspect of the invention further comprises drying the granules and particularly preferably, the granules are simultaneously dried and comminuted.

In processes according to the invention, preferably substantially all of the flavour development of the crumb takes place during the drying step.

In the second and third aspects of the invention, the conditioning step transforms the texture and other properties of the crumb in such a way that it is substantially easier to handle than the crumb paste formed by conventional methods. The change in properties brought about by the conditioning of the crumb has significant implications for the efficiency of the overall process. In particular, faster and more energy efficient drying and comminuting techniques may be used and the drying and comminuting of the crumb can be carried out simultaneously, thus improving efficiency of the process still further. This enables the size of the equipment needed to make the dried crumb to be reduced without reducing the output of dried crumb. Alternatively, if conventional drying equipment is used, the throughput of crumb can be significantly increased.

Initially, crumb paste formed by mixing the bulk sweetener, protein and water is soft and pliable and has a sticky surface. During the conditioning process, the pieces of crumb become granules of crumb which are more brittle and the surfaces of the granules become harder and non-sticky. The transformed texture of the granules means that neighbouring granules do not stick together but are able to flow past each other and as a result the granules in bulk have fluid like properties, in particular, they are free-flowing.

The properties of the granules following the conditioning process and the significantly increased surface area of the granules in comparison to a slab of crumb paste produced, for example, in conventional methods enables the use of much faster and much more efficient drying techniques to reduce the water content of the crumb. While in conventional processes, the slab of crumb paste must be gently dried under vacuum for a period of between 30 and 120 minutes to avoid overheating of the outer part of the slab, the granules can be dried at atmospheric pressure in between 10 seconds and 15 minutes, using more efficient dryers which are not suitable for the drying of crumb slabs. In particular, the free-flowing behaviour of the granules can be taken advantage of to avoid the use of slow, static drying techniques, for example thin layer rotary paddle dryers can be used to dry the granules. By replacing the conventional drying apparatus with more efficient dryers and by eliminating the vacuum apparatus, the process of the present invention is both faster and cheaper and utilises apparatus which is significantly cheaper and more compact than apparatus presently used.

The significantly smaller size of the crumb granules prior to drying compared to a slab of crumb paste, for example, in conventional processes and the brittle texture which the granules obtain during conditioning mean that further reduction of the particle size of the granules can take place within the dryer during the drying process. Although any type of dryer may be used with advantage in the second and third aspects of the invention, a thin layer rotary paddle dryer incorporating a rotor, in which the free flowing granules are continuously stirred or agitated in order to decrease the drying time and to comminute the granules, is preferred. Machines of this type are commercially available, for example Hosokawa/Bepex "Solidaire" dryers. As the size of the crumb granules is reduced, the surface area which is exposed increases rapidly thereby further reducing the length of time required to dry the crumb. The time and energy (thermal and mechanical) required to complete the overall process of producing the dried crumb is therefore reduced not only by conducting the two steps at the same time but by the reduction in the drying time required as a result of the simultaneous comminution of the crumb granules.

Preferably, the drying step is complete within between 10 seconds and 15 minutes, more preferably between 30 seconds and 5 minutes and most preferably, between 1 minute and 3 minutes.

For processes in which a thin layer rotary paddle dryer is used, hot air may be pumped through the dryer at a rate of between 0.08 $m^3$/kg of crumb and 4 $m^3$/kg of crumb, preferably between 0.5 $m^3$/kg and 1 $m^3$/kg and at a temperature of between 20° C. and 180° C., preferably between 50° C. and 120° C., more preferably between 80° C. and 100° C.

Drying does not need to be carried out under vacuum, since it is effective at atmospheric pressure. This avoids the requirement for bulky, expensive and troublesome to maintain and run vacuum equipment, which is required in conventional drying procedures in order to effectively dry the slab of crumb paste. Even in the absence of a vacuum, the drying step in the process according to the present invention is between 10 seconds and 15 minutes, in contrast to the drying time of at least 30 minutes under vacuum required in conventional processes.

Although a small amount of moisture may be lost from the surface of the granules during the conditioning process, the water content of the conditioned granules is substantially similar to that of the crumb paste before conditioning. The conditioning step, therefore, creates a more useful form of crumb paste, while leaving the composition almost unchanged. The crumb powder leaving the dryer requires no further processing and is indistinguishable from crumb produced using conventional techniques.

Preferably, in processes according to the invention, step (a) comprises making a crumb paste comprising between 5% and 10% water. This proportion of water in the crumb paste has been found to optimise the results of the conditioning process.

Preferably, the protein in the crumb made in step (a) is a milk protein which is preferably provided by skimmed milk powder, or whole milk powder.

The bulk sweetener can be, for example, sucrose, maltose, lactose, glucose syrup, fructose, or a polyol, such as maltitol, lactitol, xylitol or erythritol.

Preferably, the conditioning process is completed within between 0.5 and 120 minutes. The length of time which is required to condition the crumb is more than compensated for by the reduction in the time required to dry the crumb granules as a result of the conditioning and the overall process of producing dried crumb from crumb paste is significantly faster than conventional processes. The crumb is conditioned until the desired properties are obtained, that is, until the granules are sufficiently hard and brittle that they are able to flow freely and be readily comminuted after drying. The length of time which this takes will of course vary depending on the size and water content of the granules and the temperature at which the conditioning is carried out. Granules which are made with lower water content can be conditioned in very short times at higher temperatures and vice versa.

Preferably, the granules are dried in the dryer such that the resulting crumb contains 5% or less water by weight, preferably 4% or less water by weight, more preferably 2% or less water by weight.

Preferably, the pieces of crumb are formed by extruding the crumb paste through a die plate having a plurality of holes of a diameter of 10 mm or less, preferably followed by cutting the extruded crumb paste.

Preferably, the granules are comminuted to form a powder of particles of less than 1 mm in diameter. Since the granules of crumb mixture are already relatively small, preferably between 3 mm and 20 mm in length and approximately 10 mm in diameter, the percentage reduction in size required to form the final crumb powder is low, compared to the reduction in size which is required in conventional processes in which a large slab of crumb paste must be reduced in size to a powder. The energy input required to bring about the comminution in the process of the present invention is therefore significantly reduced compared to conventional comminution processes and can easily take place within the time which the granules are held within the dryer. The comminution process is facilitated by the brittleness of the conditioned particles.

The crumb produced by processes according to the invention is particularly suitable as an intermediate in the production of chocolate and if the crumb is intended for this purpose, cocoa mass can be added to the crumb mixture in step (a). The crumb produced by the process of the invention requires no further processing before being refined in the next stage of the chocolate making process. Crumb produced by a process according to the invention is also suitable for the production of a variety of other foodstuffs, such as chocolate powder for chocolate drinks, and any additional ingredients which may be desired can be added to the crumb in the initial mixing process or may be added to the final crumb powder.

According to a fourth aspect of the invention there is provided apparatus for the production of chocolate crumb comprising:
  (a) means for forming a wet crumb feedstock comprising bulk sweetener, protein and water; and
  (b) a thin layer rotary paddle dryer for simultaneously drying and comminuting the wet crumb feedstock.

According to a fifth aspect of the invention there is provided apparatus for the production of crumb comprising:
  (a) means for making a crumb paste comprising bulk sweetener, protein and water;
  (b) means for forming a plurality of pieces of crumb paste;
  (c) means for conditioning the pieces to form crumb granules; and
  (d) means for simultaneously drying and comminuting the granules.

Preferably, the means for conditioning the granules comprises means for maintaining the granules at a temperature between 10° C. and 80° C., preferably between 40° C. and 60° C., most preferably between 50° C. and 60° C. Preferably, the means for simultaneously drying and comminuting the granules comprises a thin layer rotary paddle dryer.

According to a sixth aspect of the invention there is provided:
(a) means for making a crumb paste comprising bulk sweetener, protein and water;
(b) means for forming a plurality of pieces of crumb paste; and
(c) means for conditioning the pieces at a temperature between 10° C. and 80° C., preferably between 40° C. and 60° C., most preferably between 50° C. and 60° C., to form crumb granules.

Preferably, apparatus according to a sixth aspect of the invention further comprises means for drying the granules and preferably, simultaneously comminuting the granules.

Preferably, in the fifth and sixth aspects of the invention, the means for simultaneously drying and comminuting the granules comprises a thin layer rotary paddle dryer. Preferably, the means for making a crumb paste comprises an extruder, for example, a screw extruder or a Z-blade mixer. Preferably, the means for forming a plurality of pieces of crumb paste comprises a die plate having a plurality of holes of a diameter of 10 mm or less and a cutter, through which the crumb paste may be extruded.

The invention will now be further described, by way of example, with reference to the accompanying drawing which shows schematically apparatus used in a process according to all aspects of the present invention.

Apparatus for producing dry crumb according to the invention may be carried out using the apparatus 2 shown schematically in the FIGURE. The crumb paste ingredients are introduced into a screw extruder 4 through an inlet 6. In the extruder 4 the ingredients are intensively mixed together and heated to a temperature between 50° C. and 85° C. The resultant paste has a water content between 5% and 10% and is viscous, soft and sticky in texture. The paste is extruded through a die plate 8 having a plurality of holes of a diameter between 2 mm and 10 mm and cut by a fly cutter 10 adjacent the die plate into pieces 12 approximately 3 mm to 20 mm in length. The pieces 12 are transferred from the cutter 10 to a conditioner 14 through an inlet 16. In the conditioner 14 the granules 12 are held at a temperature of between 10° C. and 80° C. for between 0.5 and 120 minutes. This conditioning process causes the sticky and pliable pieces 12 to transform into non-sticky and brittle conditioned granules 18. The granules 18 have a hard surface which enables them to flow freely without sticking to each other, in contrast to the pieces of crumb 12, which have soft, sticky surfaces. During the conditioning process, a small amount of moisture may be lost from the surface of the granules; however, the moisture content of the conditioned granules is still approximately 5% to 10% by weight.

After the conditioning process is complete, the conditioned granules 18 are transferred from the conditioner 14 into a thin layer rotary paddle dryer 20 through an inlet 22. The thin layer rotary paddle dryer 20 comprises a cylindrical body 24 surrounded by a heating sleeve 26. A bladed rotor 28 having a plurality of blades 30 mounted on a shaft 32 is supported for rotation inside the cylindrical body 24 of the dryer. The interior of the dryer 20 is at ambient pressure and is heated by the heating sleeve 26 to a temperature of between 70° C. and 150° C., preferably between 80° C. and 130° C., more preferably between 90° C. and 120° C. In addition, hot air may be pumped through the body of the dryer in order to assist movement of the crumb through the dryer and removal of moisture from the dryer. In addition, hot air may be pumped through the dryer. The residence time of the granules 18 within the dryer 20 is between 10 seconds and 15 minutes. During the drying process the water content of the granules 18 is reduced to approximately 2% or less and the brittle granules 18 are broken up by the rotating blades 30 into increasingly smaller particles. The resultant dried and comminuted crumb 34 leaves the dryer through an outlet 36 to be processed further, immediately or after storage. The final crumb 34 has the consistency of a powder, and approximately 75% by weight of the crumb is of a particle size less than 1 mm in diameter.

The production of a confectionery product according to the invention will now be further described with reference to the following example:

EXAMPLE 1

The ingredients listed in the table below were metered into a seven section twin screw Buhler extruder BCTG62.

| Ingredients | % by weight |
| --- | --- |
| Sugar | 52 |
| Skimmed milk powder | 20.3 |
| Whey powder | 5 |
| Lactose | 5 |
| Cocoa mass | 12 |
| Water | 5.7 |
| TOTAL | 100% |

The ingredients were mixed in the extruder at 60° C. and the resultant crumb paste was extruded through a die plate having 12 holes of 2 mm diameter and cut into 3 mm pieces, which were transferred to a conditioner and held at a temperature of 25° C. for 90 minutes, until the pieces had become brittle granules with hard surfaces. The granules were transferred into a thin layer rotary paddle dryer, the interior walls of which were at a temperature of 130° C., in which they were heated for 2.5 minutes. The granules were broken up inside the dryer by a rotor having a number of blades and rotating at 600 rpm, which also advanced the crumb through the dryer towards the exit point. Hot air at a temperature of 120° C. was pumped through the dryer at a rate of 50 m$^3$ per hour. The crumb leaving the dryer after the 2.5 minute drying period was a powder with a water content of 1.8%.

EXAMPLE 2

A 'white' crumb, without cocoa mass, was produced by the process described above in Example 1 using the ingredients shown in the table below.

| Ingredients | % by weight |
| --- | --- |
| Sugar | 55 |
| Skimmed milk powder | 37 |
| Cocoa butter | 2 |
| Water | 6 |
| TOTAL | 100% |

EXAMPLE 3

The ingredients listed in the table below were used to form crumb:

| Ingredients | % by weight |
| --- | --- |
| Sugar | 17.5 |
| Fresh whole milk | 79 |
| Cocoa mass | 3.5 |
| Water | 0 |
| TOTAL | 100% |

Fresh whole milk was condensed to 40% solids and the sugar was added and dissolved. The cocoa mass was added and the resultant mixture concentrated to 5% solids to form a paste. The paste was then conditioned by shearing and cooling in a Z blade mixer for 20 minutes at 30° C., until granular in texture. The granular material was dried in the thin layer paddle dryer as described above in Example 1.

EXAMPLE 4

The ingredients listed in the table below were mixed together in a Z blade mixer for 4 minutes to form a crumb paste:

| Ingredients | % by weight |
| --- | --- |
| Sugar | 50 |
| Skimmed milk powder | 20 |
| Whey powder | 5 |
| Lactose | 5 |
| Cocoa mass | 12 |
| Water | 8 |
| TOTAL | 100% |

The paste was formed into strips 1 m×10 cm×5 cm in size and dried in a vacuum oven at 170° C. and a pressure of 85 mbar for 30 minutes until the average water content of the paste was 5%. The partly dried strips were removed from the oven, allowed to cool and ground into pieces having a diameter of less than 5 mm. The pieces were fed into a thin layer rotary paddle dryer and dried as described in the previous examples.

EXAMPLE 5

The ingredients listed in the table below were used to form crumb:

| Ingredients | % by weight |
| --- | --- |
| Sugar | 17.5 |
| Fresh whole milk | 79 |
| Cocoa mass | 3.5 |
| TOTAL | 100% |

The fresh whole milk was condensed to 40% solids and the sugar was added and dissolved. The cocoa mass was added and the resultant mixture was concentrated to 15% solids. The slurry was deposited on a heated drum and the water content was reduced to 5%. The partly dried product was scraped from the drum in flakes and the flakes were fed into a thin layer rotary paddle dryer and dried as described above in the previous examples.

EXAMPLE 6

A paste containing 8% water was made as described in Example 4. The paste was fed into a standard paddle dryer type Komline 1.6 W and dried to 5% moisture content to form a granular material. The granular material was fed into a thin layer rotary paddle dryer and dried as described above in the previous examples.

Comparative Test

Samples of chocolate made from crumb produced by processes according to the invention ($CHOC_{inv}$) were tested by an expert sensory panel of 20 people, along with samples of chocolate made from crumb produced by existing crumb making processes ($CHOC_{std}$). The tests were carried out as blind tests in a controlled environment and for each sample, the panel was asked to identify certain flavours in the sample and rank the level of each flavour on a scale of 0 to 10, where 0 corresponds to an absence of the flavour and 10 corresponds to a strong flavour. Such tests are routinely carried out for new chocolate products. The table below shows the average value for each type of flavour for chocolate made from crumb produced by a conventional technique and chocolate made from crumb produced by processes according to the invention. For each flavour attribute, the scores for $CHOC_{inv}$ and $CHOC_{std}$ were analysed for statistical difference.

| FLAVOUR | $CHOC_{std}$ | $CHOC_{inv}$ |
| --- | --- | --- |
| Cocoa | 5.38 | 5.52 |
| Sweet | 7.59 | 7.54 |
| Cream | 4.65 | 5.08 |
| Cooked Milk | 6.03 | 6.32 |
| Caramel | 5.81 | 5.58 |
| Caramelised | 1.47 | 1.59 |
| Acid | 2.65 | 2.81 |
| Sour Milk | 0.43 | 0.22 |
| Throatburn | 4.31 | 4.48 |
| Vanilla | 3.56 | 3.03 |
| Treacle | 0.01 | 0.13 |

As can be seen from the table, the flavour levels in the chocolate made from crumb produced by processes according to the invention are very similar to those in the chocolate made from crumb made by conventional techniques and therefore, the products produced using processes and apparatus according to the invention will be indistinguishable to the consumer from currently available products. The statistical analysis showed that for all of the flavour attributes the two sets of scores were not significantly different at the 95% confidence level.

While in the embodiment described the process uses ingredients which are suitable for the production of a crumb intended for the production of chocolate, it will be appreciated that a process or apparatus according to the invention could be used to produce a wide variety of crumb based products containing bulk sweetener, protein, water and other optional ingredients.

It will also be appreciated that, while in the embodiment described the temperature and duration of the conditioning step are specified within a particular range, the conditions required in the conditioning step in order to obtain the desired properties of the granules will depend on the ingredients used in the crumb. It will be apparent to the skilled man how the parameters of the process and apparatus can be adapted in order to achieve the same results for different crumb compositions.

While in the embodiment described, the drying process takes place in a thin layer rotary paddle dryer, it will be appreciated that the drying (and combined comminuting) steps in processes according to the second and third aspects of the invention can be achieved in other types of dryers. It will also be appreciated that, while in the embodiment described the formation of the crumb pieces is achieved by extruding the crumb paste through a die plate having a plurality of holes followed by cutting, pieces can be formed in other ways and extrusion is not an essential part of the formation process. A process according to the invention may be carried out with granules of a different shape and/or size to those described in the embodiment, and the granules may be the same or slightly different shapes and sizes to each other.

While in the embodiment described, the final crumb has a particular water content and particle size, it will be appreciated that a process and apparatus according to the invention can be used to produce crumb having a different water content and/or a different particle size.

While in the embodiment described, the drying step is carried out at atmospheric pressure, it will be appreciated that drying can also be carried out under vacuum.

The invention claimed is:

1. A process for the production of chocolate crumb comprising:
    Providing chocolate crumb granules having between 5 wt. % and 10 wt. % water to a dryer wherein the granules are dried, at ambient pressure, to have a water content of 4 wt. % or less in a time period of from 10 seconds to 15 minutes.

2. The process of claim 1, wherein the chocolate crumb granules are dried to a water content of 2 wt. % or less water.

3. The process of claim 1, wherein the drying is accomplished by exposing the chocolate crumb granules to air at a temperature of from 20° C. and 180° C. and a rate of between 0.08 $m^2$/kg of crumb to 4 $m^2$/kg of crumb.

4. The process of claim 1, wherein the chocolate crumb granules are continuously stirred or agitated during drying.

5. The process of claim 1, further comprising, forming the chocolate crumb granules by conditioning discrete pieces of crumb.

6. The process of claim 1, wherein the drying time is between 30 seconds and 5 minutes.

7. The process of claim 6, wherein the drying time is between 1 minute and 3 minutes.

8. The process of claim 2, wherein the drying time is between 30 seconds and 5 minutes.

9. The process of claim 8, wherein the drying time is between 1 minute and 3 minutes.

10. The process of claim 3, wherein the air temperature is from 50° C. and 120° C. and the rate is from 0.5 $m^2$/kg of crumb and 1 $m^2$/kg of crumb.

11. The process of claim 2, wherein the drying is accomplished by exposing the chocolate crumb granules to air at a temperature of from 20° C. and 180° C. and a rate of between 0.08 $m^2$/kg of crumb to 4 $m^2$/kg of crumb.

12. The process of claim 11, wherein the air temperature is from 50° C. and 120° C. and the rate is from 0.5 $m^2$/kg of crumb and 1 $m^2$/kg of crumb.

13. The process of claim 5, wherein the conditioning comprises maintaining the discrete pieces of crumb at a temperature between 10° C. and 80° C. for a time period of from 0.5 to 120 minutes.

14. A process for the production of chocolate crumb comprising:
    Providing chocolate crumb granules having between 5 wt. % and 10 wt. % water to a dryer wherein the granules are dried, at ambient pressure, by exposing the granules to air at a temperature of from 20° C. and 180° C. and a rate of between 0.08 $m^2$/kg of crumb to 4 $m^2$/kg of crumb to have a water content of 4 wt. % or less.

15. The process of claim 14, wherein the air temperature is from 50° C. and 120° C. and the rate is from 0.5 $m^2$/kg of crumb and 1 $m^2$/kg of crumb.

16. The process of claim 14, wherein the chocolate crumb granules are dried to a water content of 2 wt % or less water.

17. The process of claim 14, wherein the drying time is between from 10 seconds to 15 minutes.

18. The process of claim 14, wherein the chocolate crumb granules are continuously stirred or agitated during drying.

19. The process of claim 18, wherein the chocolate crumb granules are comminuted to form a powder of particles less than 1 mm in diameter.

20. A process for the production of chocolate crumb comprising:
    Providing chocolate crumb granules having between 5 wt. % and 10 wt. % water to a fluidized layer dryer wherein the granules are dried, at ambient pressure, to have a water content of 4 wt. % or less.

21. The process of claim 20, wherein the drying is accomplished by exposing the chocolate crumb granules to air at a temperature of from 20° C. and 180° C. and a rate of between 0.08 $m^2$/kg of crumb to 4 $m^2$/kg of crumb.

22. The process of claim 21, wherein the air temperature is from 50° C. and 120° C. and the rate is from 0.5 $m^2$/kg of crumb and 1 $m^2$/kg of crumb.

23. The process of claim 20, wherein the fluidized layer dryer is a rotary paddle dryer.

24. The process of claim 23, wherein the chocolate crumb granules are comminuted during drying to form a powder of particles less than 1 mm in diameter.

25. The process of claim 13, wherein the temperature is between 40° C. and 60° C.

26. The process of claim 4, wherein the chocolate crumb granules are comminuted to form a powder of particles less than 1 mm in diameter.

* * * * *